(12) United States Patent
Korpela et al.

(10) Patent No.: US 9,692,497 B2
(45) Date of Patent: Jun. 27, 2017

(54) TETHERED AIRBORNE DEVICE

(71) Applicant: Sharper Shape Ltd., Helsinki (FI)

(72) Inventors: Lasse Korpela, Helsinki (FI); Atte Korhonen, Espoo (FI); Tero Heinonen, Järvenpää (FI)

(73) Assignee: Sharper Shape Oy, Helsinki (FI)

( * ) Notice: Subject to any disclaimer, the term of this patent is extended or adjusted under 35 U.S.C. 154(b) by 107 days.

(21) Appl. No.: 14/620,684

(22) Filed: Feb. 12, 2015

(65) Prior Publication Data

US 2016/0241326 A1    Aug. 18, 2016

(51) Int. Cl.
*H04B 7/185*   (2006.01)
*H04W 4/02*    (2009.01)
*B64B 1/00*    (2006.01)

(52) U.S. Cl.
CPC ........ *H04B 7/18502* (2013.01); *H04W 4/025* (2013.01); *B64B 1/00* (2013.01)

(58) Field of Classification Search
CPC .. B64B 1/00; B64B 1/50; H04B 7/185; H04B 7/18504; H04W 40/06; H04W 40/08
See application file for complete search history.

(56) References Cited

U.S. PATENT DOCUMENTS

| | | | | |
|---|---|---|---|---|
| 3,742,358 | A * | 6/1973 | Cesaro | H04B 7/18504 343/705 |
| 7,551,895 | B1 * | 6/2009 | VanLaningham | H04W 40/06 370/243 |
| 2013/0075523 | A1 * | 3/2013 | Vermillion | B64B 1/50 244/96 |

* cited by examiner

*Primary Examiner* — Khaled Kassim
*Assistant Examiner* — Zhaohui Yang
(74) *Attorney, Agent, or Firm* — Ziegler IP Law Group, LLC (57) ABSTRACT

A communication system is provided. The system comprises a ground station, one or more airborne measurement devices, and an airborne device tethered to the ground station using one or more wires. The airborne device is operable to communicate with the one or more airborne measurement devices.

20 Claims, 5 Drawing Sheets

TETHERED AIRBORNE DEVICE

TECHNICAL FIELD

The present disclosure relates generally to airborne devices; and more specifically, to apparatus for facilitating communication with one or more airborne measurement devices. Moreover, the present disclosure relates to systems for facilitating communication with one or more airborne measurement devices. Furthermore, the present disclosure also concerns methods of facilitating communication with one or more airborne measurement devices.

BACKGROUND

Typically, a radio communication link between two radio transceivers is limited by a distance between the two radio transceivers. In particular, radio-link characteristics, for example, such as a quality and a bandwidth of the radio communication link typically degrade as a function of the distance between the two radio transceivers.

In free air, the radio-link characteristics can be predicted in a straight forward manner using propagation models. However, in situations where the radio communication link between the two radio transceivers is obstructed by objects, such as buildings, terrains, forests and the like, the quality of the radio communication link suffers.

Figure 1:
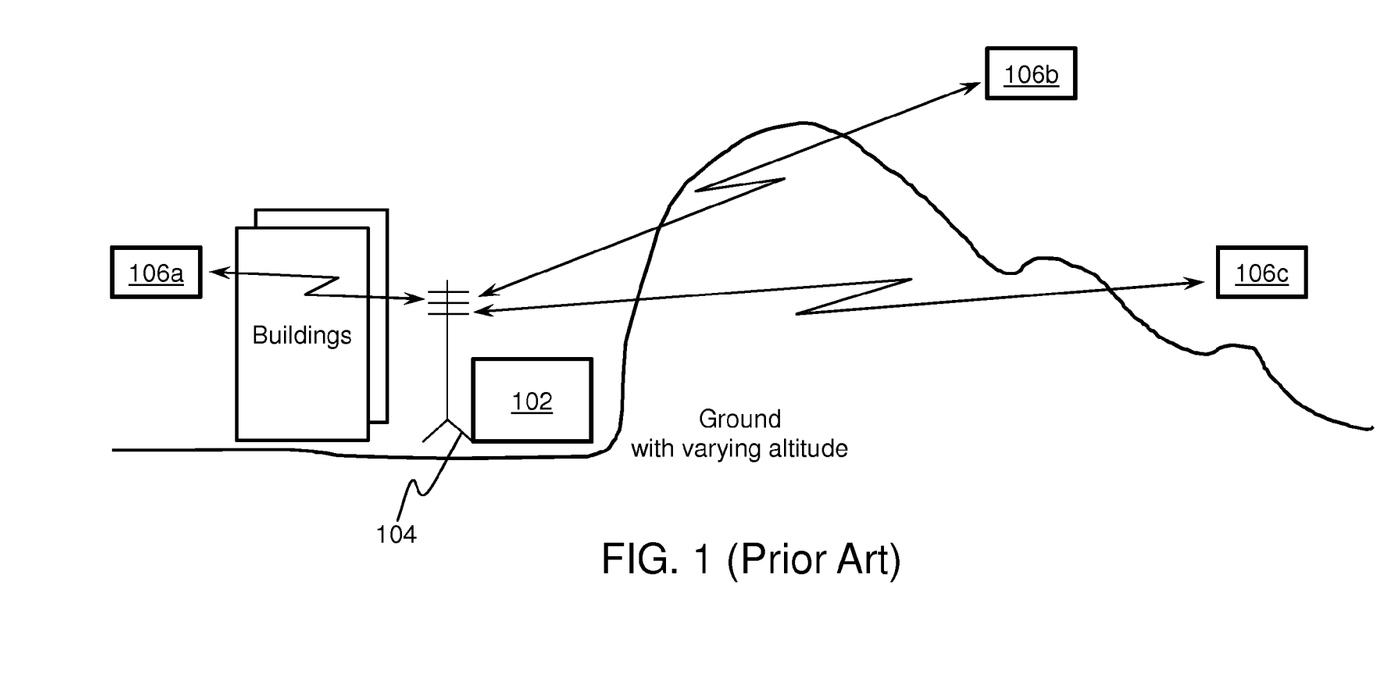
FIG. 1 (Prior Art) is a schematic illustration of an example environment.

FIG. 1 is a schematic illustration of an example environment; FIG. 1 represents prior art. In FIG. 1, there is shown a ground station 102 and an associated antenna 104. The ground station 102 and the antenna 104 are installed at a geographical position that is surrounded by a city infrastructure, such as buildings, and a ground with varying altitude, such as a mountainous terrain.

In the example environment, three airborne measurement devices, namely an airborne measurement device 106a, an airborne measurement device 106b and an airborne measurement device 106c, are employed to collect measurement data. The airborne measurement device 106a, the airborne measurement device 106b and the airborne measurement device 106c are hereinafter referred to as airborne measurement devices 106.

The ground station 102 sends control instructions to the airborne measurement devices 106. Such communication between the ground station 102 and the airborne measurement devices 106 is typically arranged via a direct radio communication link between the ground station 102 and the airborne measurement devices 106.

Problems arise when there is no direct line-of-sight between the ground station 102 and the airborne measurement devices 106. As an example, the airborne measurement device 106a is occluded by the city infrastructure, while the airborne measurement device 106b is occluded by a higher terrain point. Moreover, the airborne measurement device 106c is occluded by the curvature of the Earth. Such occlusion substantially attenuates a signal strength of the radio communication link, thereby degrading the quality of the radio communication link.

A conventional technique for overcoming the aforementioned problems employs directional antennae for better amplification of radio signals. Another conventional technique employs tracking antennae for higher amplification of radio signals. Yet another conventional technique employs a higher antenna tower.

However, these conventional techniques suffer from several disadvantages. Firstly, antennae employed in these techniques are large in size and heavy in weight. Deployment and withdrawal of such large-sized and heavy antennae is time-consuming and costly. Secondly, mobile antennae are typically limited to a certain height, which, in turn, limits a maximum transmission and/or reception distance of the mobile antennae to only a few kilometers. This restricts a range of flight operations of airborne measurement devices receiving control instructions from a ground station via a mobile antenna, thereby requiring frequent relocations of the ground station and the mobile antenna. In case of an emergency, such as disaster management, such antenna may be simply too slow to deploy.

SUMMARY

The present disclosure seeks to provide an improved communication system for facilitating communication with one or more airborne measurement devices.

The present disclosure also seeks to provide an improved communication apparatus for facilitating communication with one or more airborne measurement devices.

The present disclosure further seeks to provide an improved method of facilitating communication with one or more airborne measurement devices.

A further aim of the present disclosure is to at least partially overcome at least some of the problems of the prior art, as discussed above.

In a first aspect, embodiments of the present disclosure provide a system comprising:
 a ground station;
 at least one airborne measurement device; and
 an airborne device tethered to the ground station using at least one wire, wherein the airborne device is operable to communicate with the at least one airborne measurement device.

In a second aspect, embodiments of the present disclosure provide an apparatus comprising:
 a ground station; and
 an airborne device tethered to the ground station using at least one wire, wherein the airborne device comprises:
 a processor;
 a memory coupled to the processor; and
 a wireless transceiver unit coupled to the processor,
 wherein the processor is configured to use the wireless transceiver unit to communicate with at least one airborne measurement device.

In a third aspect, embodiments of the present disclosure provide a method comprising:
 using an airborne device, tethered to a ground station, to communicate with at least one airborne measurement device;
 receiving, from the at least one airborne measurement device, the spatial position of the at least one airborne measurement device; and
 aligning a directional antenna of the airborne device towards a given airborne measurement device, based on a spatial position of the given airborne measurement device and/or planned route information for the given airborne measurement device and/or signal strength received from the at least one airborne measurement device.

Embodiments of the present disclosure substantially eliminate or at least partially address the aforementioned problems in the prior art, and facilitate reliable communication between a ground station and at least one airborne measurement devices, using a tethered airborne device.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

GLOSSARY

Brief definitions of terms used throughout the present disclosure are given below.

The term "ground station" generally refers to a ground control station that is a part of a communication apparatus, wherein the communication apparatus is employed to control one or more airborne measurement devices. A ground station is typically located on or near the ground surface of the Earth.

The term "airborne device" generally refers to a part of a communication apparatus that is airborne while being tethered to a ground station. Typically, an airborne device is configured to communicate with one or more airborne measurement devices, via radio waves. In an example, the airborne device can be configured to send instructions to the one or more airborne measurement devices and to receive data from the one or more airborne measurement devices.

The term "airborne measurement device" generally refers to a device that is airborne and is free to move. Typically, an airborne measurement device is configured to collect measurement data.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the present disclosure provided herein, one of ordinary skill in the art will appreciate a variety of ways in which connection or coupling exists in accordance with the aforementioned definition.

The phrases "in an embodiment", "in accordance with an embodiment" and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

The terminology "at least one" and "one or more" can be used interchangeably and means that there is at least one device but that there may also be more devices, such as two, three, four, five, six, seven, eight, nine, ten or more devices.

If the specification states a component or feature "may", "can", "could", or "might" be included or have a characteristic, that particular component or feature is not required to be included or have the characteristic.

In a first aspect, embodiments of the present disclosure provide a system comprising:
a ground station;
at least one airborne measurement device; and
an airborne device tethered to the ground station using at least one wire, wherein the airborne device is operable to communicate with the at least one airborne measurement device.

For the sake of clarity, the airborne device tethered to the ground station is hereinafter referred to as "tethered airborne device".

The one or more wires serve various purposes, as described below. According to an embodiment, at least one of the one or more wires supplies power to the tethered airborne device. In an example, the power supply is provided by the ground station, which is operated by one or more batteries and/or is attached to a power generator or a power grid. This allows the tethered airborne device to be airborne for as long as required, without a need to land on the ground station for frequently recharging or replacing batteries.

According to an embodiment, at least one of the one or more wires communicably couples the tethered airborne device to the ground station. Additionally or alternatively, optionally, the tethered airborne device is communicably coupled to the ground station wirelessly.

According to an embodiment, the tethered airborne device is operable to send, to the ground station, data received from the one or more airborne measurement devices.

According to an embodiment, the tethered airborne device is operable to receive one or more instructions and/or updates from the ground station. These instructions and/or updates may, for example, include instructions for controlling the one or more airborne measurement devices and/or software updates, but are not limited thereto.

Moreover, the one or more wires potentially ensure that the tethered airborne device stays within a predefined spatial region around the ground station, during flight. This potentially allows the tethered airborne device to maintain a line-of-sight with the ground station. This is particularly beneficial in cases where the tethered airborne device is equipped with a radio repeater. In an embodiment, the radio repeater is operable to receive a radio signal from the ground station and to retransmit the radio signal to a given airborne measurement device.

As an example, the predefined spatial region can be defined with respect to a current spatial position of the ground station. In an example, the predefined spatial region can be defined by a maximum length to which the one or more wires can extend. In another example, the predefined spatial region can be defined by a maximum elevation above the ground surface of the Earth that is permissible for the tethered airborne device.

Moreover, the one or more wires attach the tethered airborne device to the ground station, thereby making the tethered airborne device a part of a communication apparatus that is stationary. As a result, the tethered airborne device does not require any special permit from aviation authorities.

Furthermore, the ground station can be installed in various ways. In an example, the ground station can be installed on a vehicle, such as a car, a truck, an all-terrain vehicle, a snow mobile and the like. In this example, the tethered airborne device becomes a part of the vehicle, thereby requiring no special permit from the aviation authorities. In another example, the ground station can be installed on an aquatic vessel, such as a boat, a ship and the like. In yet another example, the ground station can be installed on the ground surface of the Earth, a building, a bridge or any suitable infrastructure. In still another example, the ground station can be installed on a backpack that can be carried by a person.

Moreover, optionally, the ground station and the tethered airborne device are configured for automatic deployment. It will be appreciated that the tethered airborne device can be deployed or withdrawn in a very short time.

Furthermore, according to an embodiment, the tethered airborne device comprises a wireless transceiver unit comprising a directional antenna. In an embodiment, the tethered airborne device is operable to use the directional antenna to facilitate a direct radio communication link for communication with a given airborne measurement device. The direct radio communication link is typically facilitated using frequencies and transmission powers that are available under local spectrum regulations. These frequencies typically range between 433 MHz and 5 GHz. In an example, the direct radio communication link is facilitated using a same frequency that is selected and maintained for the directional antenna. In another embodiment, the tethered airborne device is operable to use laser-based optical links for communication with a given airborne measurement device. Such laser-based optical links typically require to be directed precisely to enable communication.

The tethered airborne device is operable to align the directional antenna towards the given airborne measurement device, as and when required. In an embodiment, the tethered airborne device is configured to align the directional antenna towards the given airborne measurement device, based on a spatial position of the given airborne measurement device and/or planned route information for the given airborne measurement device. Optionally, the planned route information is predetermined and, therefore, is known to the tethered airborne device well in advance. Details of how the planned route information can be used to align the directional antenna have been provided with respect to an example later.

In an alternative embodiment, the wireless transceiver unit comprises an omni-directional antenna, wherein the tethered airborne device is operable to use the omni-directional antenna to simultaneously communicate with airborne measurement devices positioned in different directions.

In an embodiment, the directional antenna is mounted on an antenna gimbal. In this embodiment, the tethered airborne device is operable to turn the antenna gimbal to align the directional antenna towards a desired direction.

In an alternative embodiment, the directional antenna is mounted directly on the tethered airborne device. In this embodiment, the tethered airborne device is operable to turn its own heading to align the directional antenna towards the desired direction.

According to an embodiment, the tethered airborne device is operable to receive, from the one or more airborne measurement devices, their respective spatial positions. In an embodiment, the one or more airborne measurement devices are operable to send their respective spatial positions to the tethered airborne device on a regular basis. For this purpose, each of the one or more airborne measurement devices comprises a Global Navigation Satellite System (GNSS) unit for determining its own spatial position.

According to an embodiment, the tethered airborne device also comprises a GNSS unit for determining its own spatial position. Knowledge of current spatial positions of the tethered airborne device and a given airborne measurement device allows the tethered airborne device to determine a relative direction from the tethered airborne device to the given airborne measurement device. This enables the directional antenna to achieve a high gain when communicating with the given airborne measurement device.

According to an embodiment, the tethered airborne device comprises an Inertial Measurement Unit (IMU) for determining an orientation of the tethered airborne device. This allows the tethered airborne device to turn its heading or an antenna gimbal, so as to point the directional antenna to the given airborne measurement device accurately.

Moreover, according to an embodiment, the tethered airborne device is operable to determine a spatial position to be reached by the tethered airborne device to maintain a line-of-sight with at least one of the one or more airborne measurement devices. Additionally, optionally, the tethered airborne device is operable to instruct a given airborne measurement device to reach a predefined position when the given airborne measurement device loses a line-of-sight with the tethered airborne device.

According to an embodiment, the tethered airborne device is operable to send control instructions to the one or more airborne measurement devices. In an embodiment, the tethered airborne device is operable to send, to the one or more airborne measurement devices, information and/or instructions pertaining to their respective planned routes (hereinafter referred to as "planned route information").

According to an embodiment, the tethered airborne device comprises one or more sensors for detecting incoming air traffic. When incoming air traffic is detected, the tethered airborne device is operable to move to a lower, safe elevation to avoid collision. Additionally, optionally, the tethered airborne device is operable to alarm the one or more airborne measurement devices when incoming air traffic is detected.

In an embodiment, the tethered airborne device is equipped with warning lights to warn incoming air traffic of danger.

For illustration purposes only, there will now be considered a first example environment where the aforementioned system is implemented pursuant to embodiments of the present disclosure. In the first example, there will now be considered that a ground station is installed at a geographical position whose three-dimensional (3D) position coordinates are (X3, Y3, Z3), and an airborne measurement device is configured to fly along a planned route in surroundings of the ground station. The airborne measurement device may, for example, be configured to capture images and/or videos during flight. In the first example, a tethered airborne device is configured to receive the captured images and/or videos from the airborne measurement device as a live data stream, and to deliver the live data stream to the ground station in real time or near real time.

Additionally, optionally, the tethered airborne device is configured to send, to the airborne measurement device, information and/or instructions pertaining to the planned route, namely planned route information for the airborne measurement device. As an example, the planned route for the airborne measurement device can be to fly from the ground station at (X3, Y3, Z3) to a first target position whose 3D position coordinates are (X1, Y1, Z1), then to a second target position whose 3D position coordinates are (X2, Y2, Z2), and then to return to the ground station at (X3, Y3, Z3).

The entire planned route information may be sent to the airborne measurement device either at once or in parts. In an example, the planned route may be predetermined, and the entire planned route information may be known to the airborne measurement device and the tethered airborne device well in advance. In another example, the ground station may use the tethered airborne device to send the planned route information to the airborne measurement device in parts. As an example, the tethered airborne device may instruct the airborne measurement device to wait, upon reaching a given target position, for any further instructions.

Moreover, in order to be able to communicate with the airborne measurement device properly, the tethered airborne device maintains a line-of-sight with the airborne measurement device. For this purpose, the tethered airborne device may be configured to stay at a suitable position above the ground station. An example of how a suitable elevation of the tethered airborne device may be selected has been provided in conjunction with FIG. 3.

However, there might be some situations where it may not be possible for the tethered airborne device to maintain the line-of-sight with the airborne measurement device at all times. In this regard, optionally, the tethered airborne device instructs the airborne measurement device to reach a predefined position when the airborne measurement device loses the line-of-sight with the tethered airborne device. Such instructions are beneficially sent to the airborne measurement device beforehand. This potentially allows the tethered airborne device and the airborne measurement device to regain a line-of-sight after it has been lost and to restart a communication session after it has been disrupted.

For illustration purposes only, let us consider in the first example herein that the airborne measurement device goes behind a mountain when it reaches the second target position. As a result, a communication session between the tethered airborne device and the airborne measurement device is disrupted. The airborne measurement device then reaches the predefined position as per the instructions, while the tethered airborne device aligns its directional antenna towards the predefined position.

In this manner, the planned route information allows the tethered airborne device to predict where the airborne measurement device would appear, even after the line-of-sight between the tethered airborne device and the airborne measurement device is lost.

For illustration purposes only, there will next be considered a second example environment where the aforementioned system is implemented pursuant to embodiments of the present disclosure. One such example environment has been illustrated in conjunction with FIG. 2.

In the second example, there will now be considered that a ground station is installed at a geographical position that is surrounded by a city infrastructure, such as buildings, and a mountainous terrain. Additionally, there will now be considered that three airborne measurement devices, namely a first airborne measurement device, a second airborne measurement device and a third airborne measurement device, are configured to fly along their respective planned routes in the surroundings of the ground station. These airborne measurement devices are configured to collect sensor data, for example, such as Light Detection And Ranging (LiDAR) data during their flight. In the second example, a tethered airborne device is configured to receive the sensor data from the airborne measurement devices, and to deliver the sensor data to the ground station in real time or near real time.

In the second example herein, let us consider that the tethered airborne device sends, to the airborne measurement devices, their respective planned route information in parts. In this regard, optionally, the tethered airborne device time-deviation multiplexes between the first, second and third airborne measurement devices. As an example, the tethered airborne device may first align its directional antenna towards a starting position of the first airborne measurement device and give instructions to the first airborne measurement device to go to a target position 'A'. The tethered airborne device may then align its directional antenna towards a starting position of the second airborne measurement device and give instructions to the second airborne measurement device to go to a target position 'B'. The tethered airborne device may then align its directional antenna towards a starting position of the third airborne measurement device and give instructions to the third airborne measurement device to go to a target position 'C'.

Next, the tethered airborne device may align its directional antenna towards the target position 'A', where the first airborne measurement device is expected to reach, and give instructions to the first airborne measurement device to go to a target position 'D'. The tethered airborne device may then align its directional antenna towards the target position 'B', where the second airborne measurement device is expected to reach, and give instructions to the second airborne measurement device to go to a target position 'E'. Likewise, the tethered airborne device may then align its directional antenna towards the target position 'C', where the third airborne measurement device is expected to reach, and give instructions to the third airborne measurement device to go to a target position 'F'. In this manner, the tethered airborne device may repeatedly multiplex between the first, second and third airborne measurement devices.

There might arise a situation wherein when giving instructions to one of the airborne measurement devices, the tethered airborne device temporarily loses a line-of-sight with one or both of other airborne measurement devices. However, from previous instructions, the tethered airborne device knows target positions where the remaining airborne measurement devices are expected to reach. This enables the tethered airborne device to regain a line-of-sight with the other airborne measurement devices, when required.

Moreover, there might arise a situation wherein it may not be possible for the tethered airborne device to maintain a line-of-sight with, for example, the first airborne measurement device at the target position 'D'. In such a situation, the tethered airborne device aligns its directional antenna towards a predefined position where the first airborne measurement device is expected to reach after the target position 'D'. For this purpose, the tethered airborne sends instructions pertaining to the predefined position to the first airborne measurement device beforehand, as described earlier in conjunction with the first example.

Furthermore, in a second aspect, embodiments of the present disclosure provide an apparatus comprising:
   a ground station; and
   an airborne device tethered to the ground station using at least one wire, wherein the airborne device comprises:
      a processor;
      a memory coupled to the processor; and
      a wireless transceiver unit coupled to the processor,
      wherein the processor is configured to use the wireless transceiver unit to communicate with at least one airborne measurement device.

According to an embodiment, at least one of the one or more wires communicably couples the airborne device to the ground station.

According to an embodiment, at least one of the one or more wires supplies power to the airborne device.

According to an embodiment, the processor is configured to receive, from the one or more airborne measurement devices, their respective spatial positions.

According to an embodiment, the wireless transceiver unit comprises a directional antenna. In this embodiment, the processor is configured to align the directional antenna towards a given airborne measurement device, based on a spatial position of the given airborne measurement device and/or planned route information for the given airborne measurement device.

According to an embodiment, the processor is configured to determine a spatial position to be reached by the airborne device to maintain a line-of-sight with at least one of the one or more airborne measurement devices.

According to an embodiment, the processor is configured to send, to the ground station, data received from the one or more airborne measurement devices.

According to an embodiment, the airborne device further comprises one or more sensors for detecting incoming air traffic. In an embodiment, the processor is configured to alarm the one or more airborne measurement devices when incoming air traffic is detected.

According to an embodiment, the airborne device further comprises a GNSS unit for determining a spatial position of the airborne device.

According to an embodiment, the airborne device further comprises an IMU for determining an orientation of the airborne device.

Figures 4A, 4B:
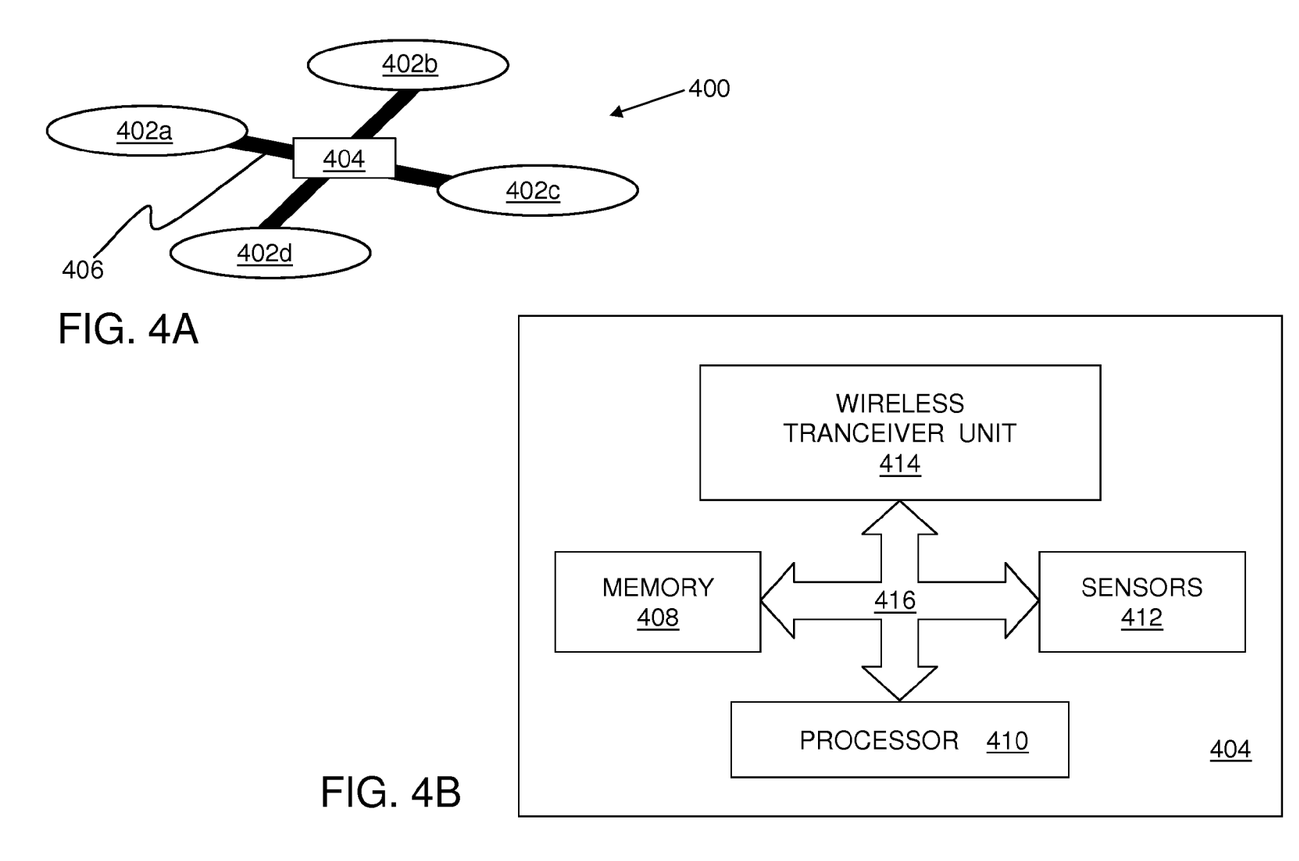
FIGS. 4A and 4B are schematic illustrations of various components of an airborne device, in accordance with an embodiment of the present disclosure.

Furthermore, an example airborne device has been illustrated in conjunction with FIGS. 4A and 4B. In accordance with an embodiment of the present disclosure, an airborne device includes one or more propellers, wherein each propeller includes its associated motor unit for driving that propeller. The airborne device also includes a main unit that is attached to the one or more propellers by one or more arms. It is to be noted here that the airborne device could be implemented by way of fixed-wing aircrafts, multi-copters, or harriers.

One or more wires tethering the airborne device to a ground station supply electrical power to various components of the airborne device, namely, the one or more propellers and various sub-components of the main unit. In an example, the power supply is provided by the ground station, which is operated by one or more batteries and/or is attached to a power generator or a power grid. This allows the airborne device to be airborne for as long as required, without a need to land on the ground station for frequently recharging or replacement of batteries.

In an embodiment, the main unit includes an auxiliary power source. The auxiliary power source may be used to supply electrical power to the various components of the airborne device, for example, when the power supply is unavailable from the one or more wires. As an example, the power supply may become unavailable from the one or more wires when the one or more wires break. In such a case, the airborne device may fly to communicate with one or more airborne measurement devices for as long as the auxiliary power source allows. Before landing, the airborne device may give instructions to the one or more airborne measurement devices to come back to the ground station after completing their respective planned routes.

Optionally, the auxiliary power source includes a rechargeable battery, for example, such as a Lithium-ion battery. The battery may be recharged or replaced, when the airborne device lands, for example, on a landing platform of the ground station.

Furthermore, the main unit includes, but is not limited to, a data memory, a computing hardware such as a processor, a configuration of sensors, a wireless transceiver unit, and a system bus that operatively couples various components including the data memory, the processor, the configuration of sensors and the wireless transceiver unit.

The data memory optionally includes non-removable memory, removable memory, or a combination thereof. The non-removable memory, for example, includes Random-Access Memory (RAM), Read-Only Memory (ROM), flash memory, or a hard drive. The removable memory, for example, includes flash memory cards, memory sticks, or smart cards.

The processor is configured to use the wireless transceiver unit to communicate with one or more airborne measurement devices.

The wireless transceiver unit includes a directional antenna. In an embodiment, the directional antenna is mounted on an antenna gimbal. In this embodiment, the processor is configured to turn the antenna gimbal to align the directional antenna towards a desired direction. In an alternative embodiment, the processor is configured to turns a heading of the airborne device to align the directional antenna towards the desired direction.

According to an embodiment, the processor is configured to send control instructions to the one or more airborne measurement devices. In an embodiment, the processor is configured to send respective planned route information to the one or more airborne measurement devices.

According to an embodiment, the processor is configured to receive data from the one or more airborne measurement devices, and to send the received data to the ground station.

Communication between the airborne device and the ground station occurs either wirelessly or via at least one of the one or more wires.

Moreover, the configuration of sensors includes one or more of: a thermal camera, an image and/or video camera, an IMU, a GNSS unit, an altitude meter, a magnetometer, an accelerometer, and/or a gyroscopic sensor.

In an embodiment, the processor is configured to employ a LiDAR scanner (Light Detection And Ranging), thermal camera or an image and/or video camera to scan surroundings of the airborne device, and to detect incoming air traffic.

In an embodiment, the processor is configured to employ the IMU and the GNSS unit to determine a relative direction from the airborne device to a given airborne measurement device, so as to align the directional antenna towards the given airborne measurement device.

Furthermore, in an alternative implementation, the aforementioned apparatus can be used for creating an ad hoc wireless network. As an example, an airborne device tethered to a ground station can be used for various purposes, including at least one of:
(i) replacing temporarily a mobile base station of a cellular network, for example, in case of a failure of the mobile base station;
(ii) adding temporary base stations to increase a capacity of the cellular network, for example, in case of a major event;
(iii) creating a Wi-Fi network or any other wireless Internet Protocol (IP) network in areas having no permanent infrastructure; and
(iv) creating an ad hoc wireless network for accurate positioning of a transmitter, for example, in case of a search and rescue operation requiring a mobile phone to be located accurately.

Moreover, in an embodiment, a plurality of the aforementioned apparatus can be employed to form a mesh network. Such a mesh network potentially enables a first party to communicate with a second party, as long as the first and second parties remain within a transmission range from any tethered airborne device of the mesh network.

In a third aspect, embodiments of the present disclosure provide a method comprising:

using an airborne device, tethered to a ground station, to communicate with at least one airborne measurement device;

receiving, from the at least one airborne measurement device, the spatial position of the at least one airborne measurement device; and aligning a directional antenna of the airborne device towards a given airborne measurement device, based on a spatial position of the given airborne measurement device and/or planned route information for the given airborne measurement device.

According to an embodiment, the method further comprises determining a spatial position to be reached by the airborne device to maintain a line-of-sight with at least one of the one or more airborne measurement devices.

According to an embodiment, the method further comprises sending, to the ground station, data received from the one or more airborne measurement devices.

DETAILED DESCRIPTION OF DRAWINGS

Figure 2:
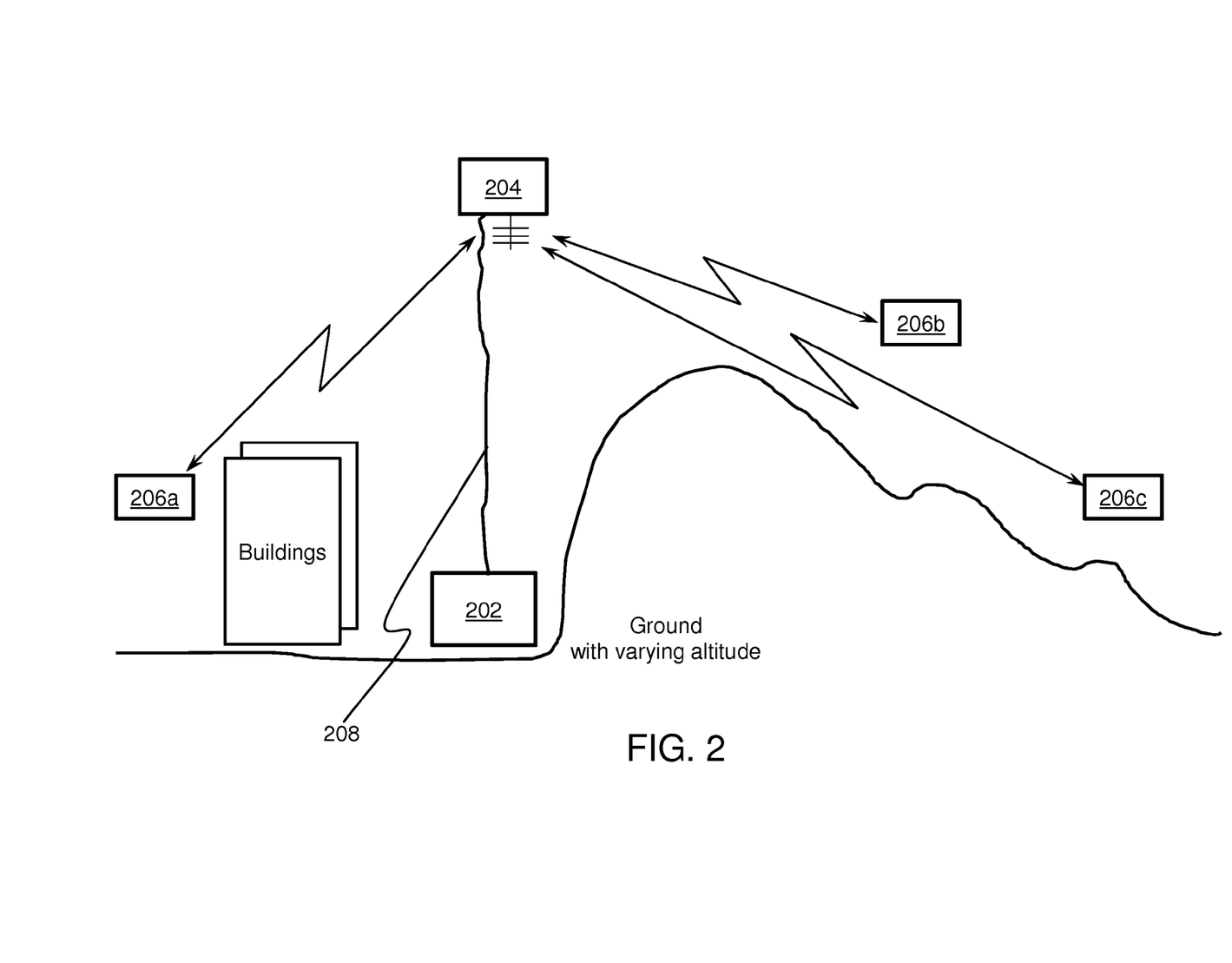
FIG. 2 is a schematic illustration of an example environment, wherein a system is implemented pursuant to embodiments of the present disclosure.

Referring now to the drawings, particularly by their reference numbers, FIG. 2 is a schematic illustration of an example environment, wherein a system 200 is implemented pursuant to embodiments of the present disclosure. The system 200 includes a ground station 202, a tethered airborne device 204 and one or more airborne measurement devices, depicted as an airborne measurement device 206a, an airborne measurement device 206b and an airborne measurement device 206c in FIG. 2. The airborne measurement devices 206a, 206b and 206c are hereinafter collectively referred to as airborne measurement devices 206.

With reference to FIG. 2, the ground station 202 is installed at a geographical position that is surrounded by a city infrastructure, such as buildings, and a ground with varying altitude, such as a mountainous terrain.

The tethered airborne device 204 is configured to fly above the ground station 202 while being tethered to the ground station 202 via one or more wires, depicted as a wire 208 in FIG. 2.

The tethered airborne device 204 is capable of maintaining a line-of-sight with the airborne measurement device 206a, which would otherwise be occluded by the city infrastructure. Likewise, the tethered airborne device 204 is capable of maintaining a line-of-sight with the airborne measurement device 206b, which would otherwise be occluded by the mountainous terrain. Likewise, the tethered airborne device 204 is capable of maintaining a line-of-sight with the airborne measurement device 206c, which would otherwise be occluded by the curvature of the Earth.

FIG. 2 is merely an example, which should not unduly limit the scope of the present disclosure. It is to be understood that the illustration of the system 200 is provided as an example and is not limited to a specific number and/or arrangement of ground stations, tethered airborne devices and airborne measurement devices. A person skilled in the art will recognize many variations, alternatives, and modifications of embodiments of the present disclosure.

Figure 3:
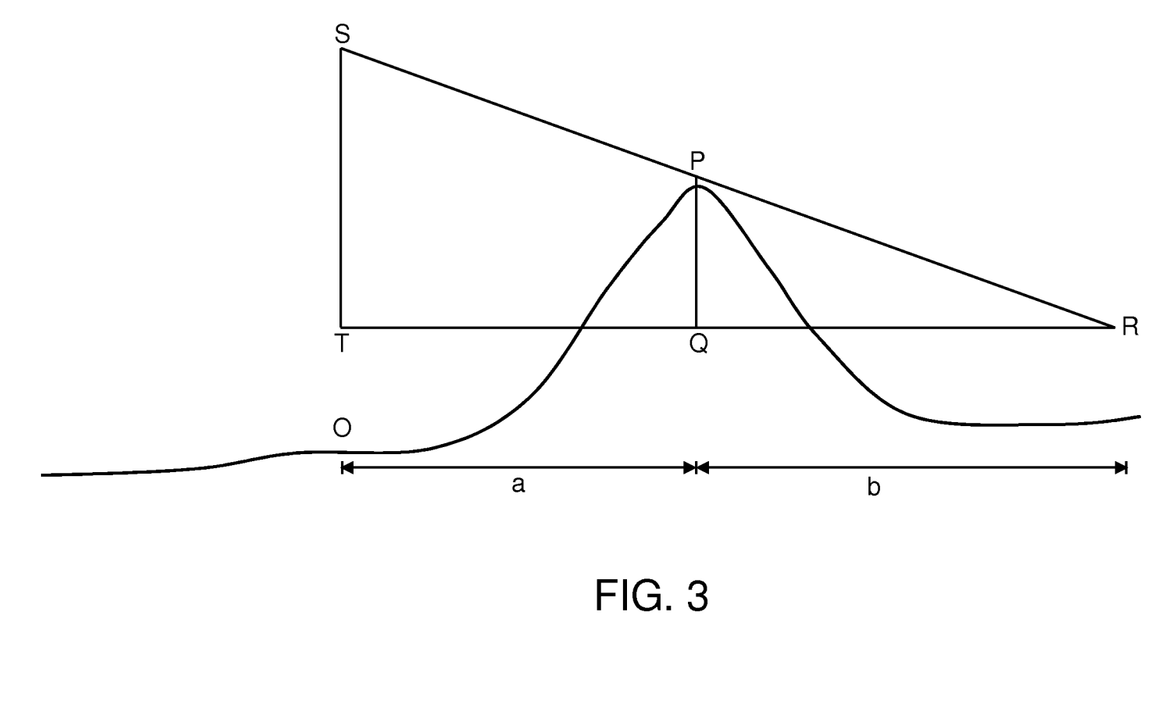
FIG. 3 is a schematic illustration of an example of how a suitable elevation is selected for a tethered airborne device, in accordance with an embodiment of the present disclosure.

FIG. 3 is a schematic illustration of an example of how a suitable elevation is selected for a tethered airborne device, in accordance with an embodiment of the present disclosure. In FIG. 3, there are shown a mountain, a position 'O' on one side of the mountain where a ground station is installed, and a position 'R' on an opposite side of the mountain where an airborne measurement device is employed.

There are also shown two similar triangles, namely triangles 'PQR' and 'RST', wherein 'P' is a position above a tip of the mountain, and 'S' is a position above the ground station. In the example herein, the tethered airborne device may be configured to stay at the position 'S' or any other suitable position on or above a line 'PS', in order to maintain a line-of-sight with the airborne measurement device at the position 'R'.

In FIG. 3, following representations have been used:
'a' represents a horizontal distance between the ground station and the tip of the mountain, namely a length of a line 'QT';
'b' represents a horizontal distance between the airborne measurement device and the tip of the mountain, namely a length of a line 'QR';
'c' represents a length of a line 'ST'; and
'd' represents a length of a line 'PQ'.

For illustration purposes only, let us consider that both 'a' and 'b' are equal to 500 meters, an altitude of the mountain above the surface of the Earth is 200 meters, and an elevation of the airborne measurement device is 100 meters. Therefore, 'd' can be calculated as 100 meters.

From similar triangles, following equation can be derived:

$$\frac{c}{(a+b)} = \frac{d}{b}$$

Using the above equation, 'c' can be calculated as 200 meters. Therefore, the vertical distance between the position 'S' and the ground station can be calculated as 300 meters.

FIG. 3 is merely an example, which should not unduly limit the scope of the present disclosure. A person skilled in the art will recognize many variations, alternatives, and modifications of embodiments of the present disclosure.

FIGS. 4A and 4B are schematic illustrations of various components of an airborne device 400, in accordance with an embodiment of the present disclosure. The airborne device 400 includes one or more propellers, depicted as a propeller 402a, a propeller 402b, a propeller 402c and a propeller 402d in FIG. 4A (hereinafter collectively referred to as propellers 402).

The airborne device 400 also includes a main unit 404 that is attached to the propellers 402 by arms 406.

With reference to FIG. 4B, the main unit 404 includes, but is not limited to, a data memory 408, a computing hardware such as a processor 410, a configuration of sensors 412, a wireless transceiver unit 414, and a system bus 416 that operatively couples various components including the data memory 408, the processor 410, the configuration of sensors 412 and the wireless transceiver unit 414.

FIGS. 4A and 4B are merely examples, which should not unduly limit the scope of the claims herein. It is to be understood that the specific designation for the airborne device 400 is provided as an example and is not to be construed as limiting the airborne device 400 to specific numbers, types, or arrangements of modules and/or components of the airborne device 400. A person skilled in the art will recognize many variations, alternatives, and modifications of embodiments of the present disclosure. It is to be noted here that the airborne device 400 could be implemented by way of fixed-wing aircrafts, multi-copters, or harriers.

Figure 5:
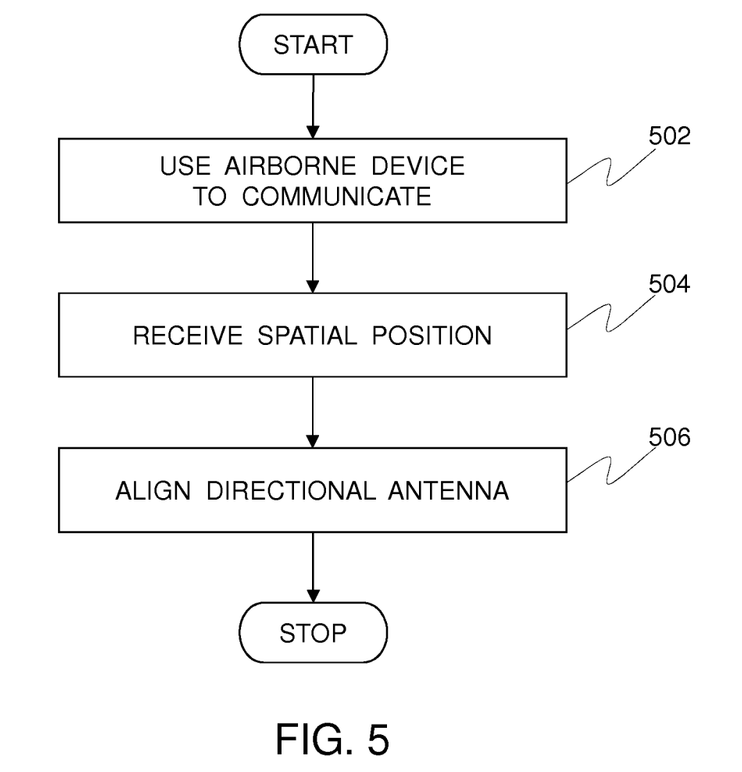
FIG. 5 is an illustration of steps of a method of facilitating communication with one or more airborne measurement devices, in accordance with an embodiment of the present disclosure.

FIG. 5 is an illustration of steps of a method of facilitating communication with one or more airborne measurement devices, in accordance with an embodiment of the present disclosure. The method is depicted as a collection of steps in a logical flow diagram, which represents a sequence of steps that can be implemented in hardware, software, or a combination thereof.

At a step 502, a tethered airborne device is used to communicate with the one or more airborne measurement devices.

At a step 504, the tethered airborne device receives, from the one or more airborne measurement devices, their respective spatial positions.

At a step 506, the tethered airborne device aligns its directional antenna towards a given airborne measurement device, based on a spatial position of the given airborne measurement device and/or planned route information for the given airborne measurement device.

The steps 502 to 506 are only illustrative and other alternatives can also be provided where one or more steps are added, one or more steps are removed, or one or more steps are provided in a different sequence without departing from the scope of the claims herein.

Embodiments of the present disclosure are susceptible to being used for various purposes, including, though not limited to, facilitating reliable communication between a ground station and one or more airborne measurement devices, using a tethered airborne device.

Modifications to embodiments of the present disclosure described in the foregoing are possible without departing from the scope of the present disclosure as defined by the accompanying claims. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A system comprising:
    a ground station;
    at least one airborne measurement device; and
    an airborne device tethered to the ground station using at least one wire that maintains the airborne device in line of sight with the ground station, wherein the airborne device is configured to communicate with the at least one airborne measurement device including sending in a multiplexed manner each of the at least one airborne measurement device a planned route information in parts by:
    aligning a directional antenna of the airborne device with a starting position of a first airborne measurement device and instruct the first airborne measurement device to proceed to a first pre-determined position;
    aligning the directional antenna of the airborne device with a starting position of at least one other airborne measurement device and instruct the at least one other airborne measurement device to proceed to at least one other first pre-determined position
    aligning the directional antenna with the first pre-determined position of the first airborne measurement device and instructing the first measurement device to proceed to a next pre-determined position;
    aligning the directional antenna with the at least one other first pre-determined position and instructing the at least one other airborne measurement device to proceed to at least one other next pre-determined position; and
    wherein upon a loss of the line of sight with the at least one airborne measurement device, the airborne device is configured to determine a next pre-determined position of the at least one airborne measurement device and reposition the directional antenna in a direction of the next pre-determined position of the at least one airborne measurement device.

2. The system of claim 1, wherein the airborne device is configured to receive, from the at least one airborne measurement device, the spatial position of the at least one airborne measurement device.

3. The system of claim 2, wherein the airborne device comprises a wireless transceiver unit comprising a directional antenna, and wherein the airborne device is configured to align the directional antenna towards a given airborne measurement device, based on a spatial position of the given airborne measurement device and/or planned route information for the given airborne measurement device.

4. The system of claim 2, wherein the airborne device is configured to determine a spatial position to be reached to maintain a line-of-sight with at least one of the at least one airborne measurement device.

5. The system of claim 1, wherein the airborne device is configured to send to the ground station data received from the at least one airborne measurement device.

6. The system of claim 1, wherein the airborne device comprises at least one sensor for detecting incoming air traffic, and wherein the airborne device is configured to alarm the at least one airborne measurement device when incoming air traffic is detected and/or the airborne device comprises an inertial measurement unit for determining an orientation of the airborne device.

7. The system of claim 1, wherein each of the at least one airborne measurement device and the airborne device comprises a global navigation satellite system unit for determining its spatial position.

8. The system of claim 1, wherein at least one of the at least one wire communicably couples the airborne device to the ground station.

9. The system of claim 1, wherein at least one of the at least one wire supplies power to the airborne device.

10. An apparatus comprising:
   a ground station; and
   an airborne device tethered to the ground station using at least one wire that maintains the airborne device in line of sight with the ground station, the airborne device being electrically coupled to and receiving electrical power from the ground station, wherein the airborne device comprises:
      a processor;
      a memory coupled to the processor; and
      a wireless transceiver unit coupled to the processor,
   wherein the processor is configured to use the wireless transceiver unit to communicate with at least one airborne measurement device including sending in a multiplexed manner each of the at least one airborne measurement device a planned route information in parts by:
   aligning a directional antenna of the airborne device with a starting position of a first airborne measurement device and instruct the first airborne measurement device to proceed to a first pre-determined position;
   aligning the directional antenna of the airborne device with a starting position of at least one other airborne measurement device and instruct the at least one other airborne measurement device to proceed to at least one other first pre-determined position;
   aligning the directional antenna with the first pre-determined position of the first airborne measurement device and instructing the first measurement device to proceed to a next pre-determined position;
      aligning the directional antenna with the at least one other first pre-determined position and instructing the at least one other airborne measurement device to proceed to at least one other next pre-determined position; and
   wherein upon a loss of the line of sight with the at least one airborne measurement device, the airborne device is configured to determine a next pre-determined position of the at least one airborne measurement device and reposition the directional antenna in a direction of the next pre-determined position of the at least one airborne measurement device.

11. The apparatus of claim 10, wherein the processor is configured to receive, from the at least one airborne measurement device, the spatial position of the at least one airborne measurement device.

12. The apparatus of claim 11, wherein the wireless transceiver unit comprises a directional antenna, and wherein the processor is configured to align the directional antenna towards a given airborne measurement device, based on a spatial position of the given airborne measurement device and/or planned route information for the given airborne measurement device.

13. The apparatus of claim 11, wherein the processor is configured to determine a spatial position to be reached by the airborne device to maintain a line-of-sight with at least one of the at least one airborne measurement device.

14. The apparatus of claim 10, wherein the processor is configured to send, to the ground station, data received from the at least one airborne measurement device.

15. The apparatus of claim 10, wherein the airborne device further comprises at least one of the following: at least one sensor for detecting incoming air traffic, and wherein the processor is configured to alarm the at least one airborne measurement device when incoming air traffic is detected a global navigation satellite system unit for determining a spatial position of the airborne device, and an inertial measurement unit for determining an orientation of the airborne device.

16. The apparatus of claim 10, wherein at least one of the at least one wire communicably couples the airborne device to the ground station.

17. The apparatus of claim 10, wherein at least one of the at least one wire supplies power to the airborne device.

18. A method comprising:
   using an airborne device, tethered to a ground station, to communicate with at least one airborne measurement device the tether configured to maintain the airborne device in line of sight with the ground station, the airborne device being electrically coupled to and receiving electrical power from the ground station;
   receiving, from the at least one airborne measurement device, the spatial position of the at least one airborne measurement device; and
   aligning a directional antenna of the airborne device towards a given airborne measurement device, based on a spatial position of the given airborne measurement device and/or planned route information for the given airborne measurement device and/or signal strength received from the at least one airborne measurement device; and
   sending in a multiplexed manner each of the at least one airborne measurement device a planned route information in parts including:
   aligning a directional antenna of the airborne device with a starting position of a first airborne measurement device and instruct the first airborne measurement device to proceed to a first pre-determined position;
   aligning the directional antenna of the airborne device with a starting position of at least one other airborne measurement device and instruct the at least one other airborne measurement device to proceed to at least one other first pre-determined position;
   aligning the directional antenna with the first pre-determined position of the first airborne measurement device and instructing the first measurement device to proceed to a next pre-determined position;
   aligning the directional antenna with the at least one other first pre-determined position and instructing the at least one other airborne measurement device to proceed to at least one other next pre-determined position; and
   wherein upon a loss of the line of sight with the at least one airborne measurement device, the airborne device is configured to determine a next pre-determined position of the at least one airborne measurement device and reposition the directional antenna in a direction of the next pre-determined position of the at least one airborne measurement device.

19. The method of claim 18 further comprising determining a spatial position to be reached by the airborne device to maintain a line-of-sight with at least one of the at least one airborne measurement device.

20. The method of claim 18 further comprising sending, to the ground station, data received from the at least one airborne measurement device.

\* \* \* \* \*